United States Patent Office 3,270,843
Patented Sept. 6, 1966

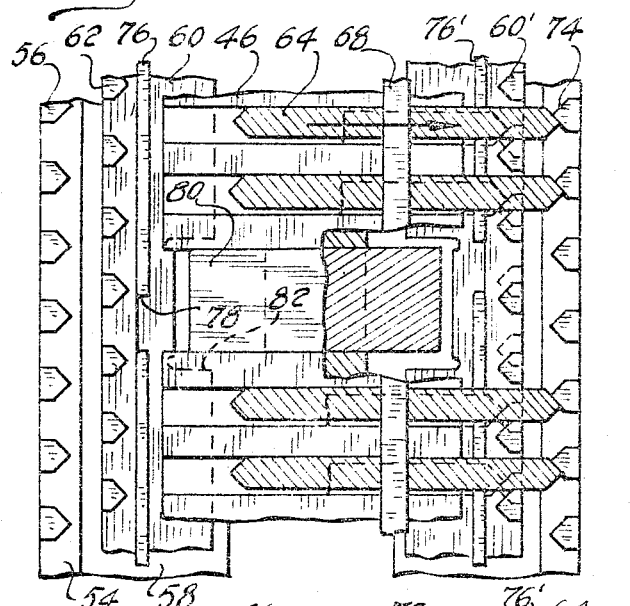
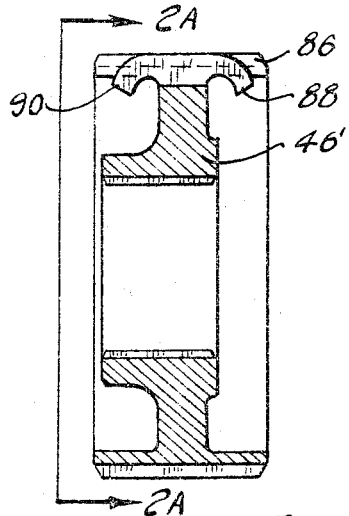
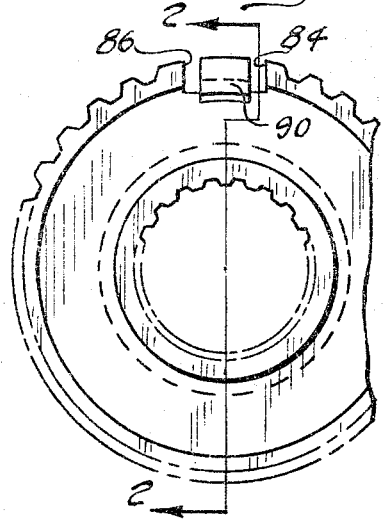
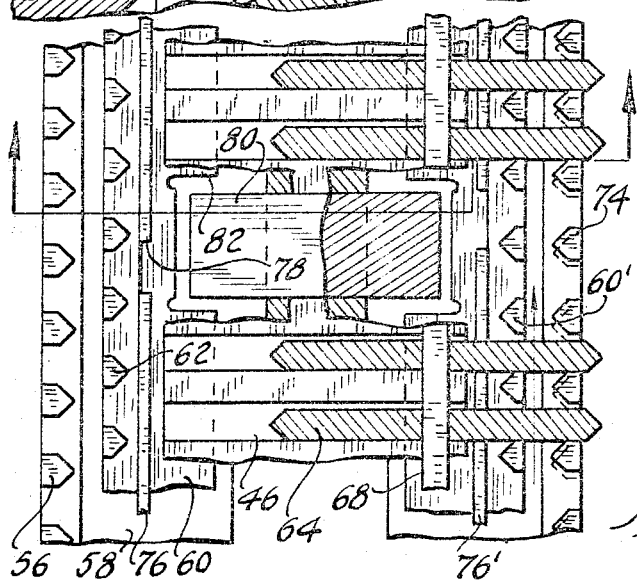

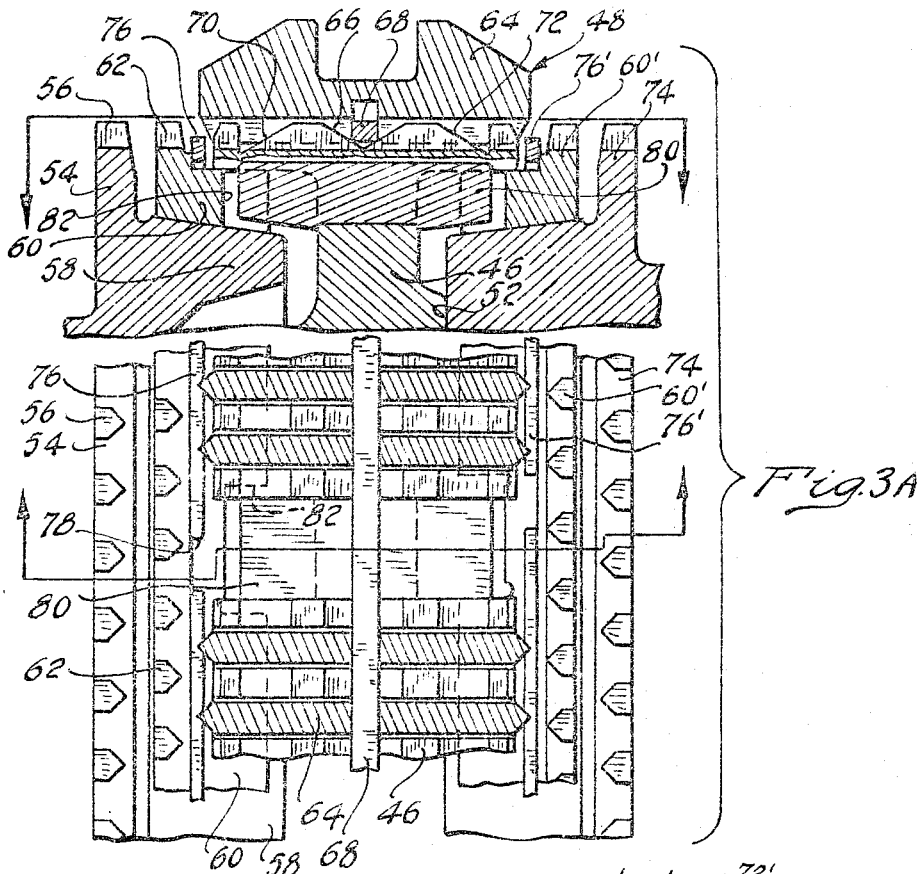
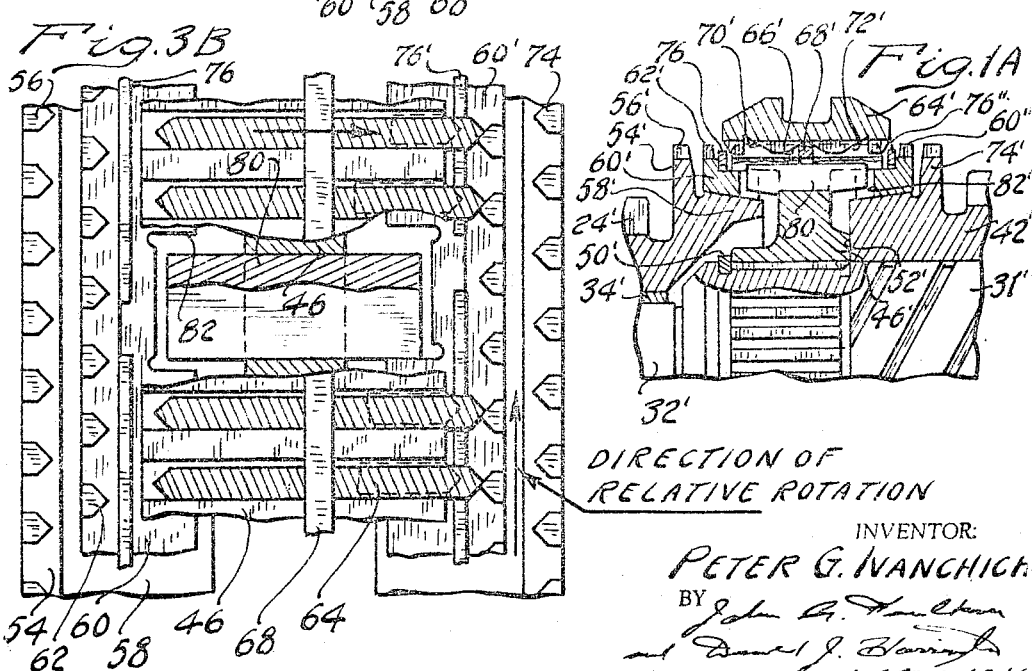

3,270,843
SYNCHRONIZER CLUTCH ASSEMBLY
Peter G. Ivanchich, Dearborn, Mich., assignor to Ford Motor Company, Dearborn, Mich., a corporation of Delaware
Filed May 4, 1964, Ser. No. 364,526
5 Claims. (Cl. 192—53)

My invention relates generally to improvements in positive acting clutch structures having engageable clutch teeth and more particularly to synchronizer clutch mechanisms capable of clutching together two torque delivery members wherein provision is made for synchronizing the motion of one member with respect to the other prior to the completion of the clutching action.

The improved synchronizer clutch assembly of my invention is capable of being used in a gear system for a power transmission mechanism in an automotive vehicle drive line. Conventional synchronizer clutch assemblies now in use in such environments include usually a synchronizer clutch sleeve carried by one torque delivery member of the gear system and a cooperating clutch element having external teeth carried by a companion torque delivery member.

A synchronizer blocker ring normally is situated between the external clutch teeth and internal clutch teeth formed on the synchronizer clutch sleeve. The clutch element and the blocker ring are formed with cooperating cone clutch surfaces. Thrust bars carried by the synchronizer clutch hub are spring biased in a radially outward direction into engagement with the surrounding clutch sleeve. Upon shifting movement of the clutch sleeve in one direction, the thrust bars exert an axial force upon the blocker ring thereby establishing clutching action between the cone surfaces of the cone clutch structure. The inertia due to the differential speeds of the torque delivery members thus is dissipated. As the motion of one member is brought into synchronism with the motion of the other, the sleeve then may be shifted through the blocker ring into clutching engagement with the clutch teeth carried by the other torque delivery member. This locks the synchronizer hub to the other torque delivery member thereby establishing a torque delivery path.

Thrust force is applied to the thrust bars by means of a spring actuated detent connection between the sleeve and the thrust bars. This detent action occurs, however, only if the sleeve and the thrust bars are in a proper relative axial position.

The sleeve is moved from a so-called neutral or disengaged position to an engaged position by means of a driver controlled linkage mechanism which includes a shift fork having its ends received in an annular groove in the periphery of the sleeve. The two positions of the sleeve are established by independent detent elements in the shift linkage itself. Shifting movement of the linkage mechanism is translated into an axial shifting movement of the sleeve by means of a shifter fork that engages an annular groove in the sleeve.

It is possible in an arrangement of this type to move the sleeve under some conditions into clutching engagement with the external teeth of the clutch element without allowing the blocker ring to establish synchronism. This is described as a so-called "crash-through" condition. It may take place when the cooperating detent elements of the thrust bars and the sleeve are out of registry prior to shifting movement of the driver operated shift linkage mechanism. The sleeve then is moved without an accompanying thrust upon the blocker ring.

This condition is aggravated as the shifter fork becomes worn due to relative motion between the shifter fork and the grooved sleeve.

It is an object of my invention to overcome the shortcomings of a synchronizer clutch assembly of the conventional type by making provision for establishing positively each operating position with respect to the hub that carries it.

It is a further object of my invention to provide a synchronizer of the type above set forth wherein the cone clutch structure of the blocker ring is actuated upon shifting movement of the sleeve by providing a yieldable spring between the sleeve and the blocker ring that establishes a controlled amount of interference as the sleeve is shifted toward a clutching position.

It is a further object of my invention to provide a synchronizer clutch assembly of the type above set forth wherein provision is made for shifting rotatably the blocker ring a distance equal to one-quarter the circular pitch of the teeth of the clutch element whenever the sleeve is shifted toward the clutching position thereby assuring that the motion of the sleeve will be blocked until synchronism is established.

It is a further object of my invention to provide a synchronizer clutch assembly that is substantially simpler in construction than synchronizer clutch assemblies currently used in automotive vehicle drive lines.

For the purpose of particularly describing the improvements of my invention, reference will be made to the accompanying drawings, wherein:

FIGURE 1A is a partial assembly view of my improved clutch structure with a modified sleeve detent;

FIGURE 2 is a cross sectional view of a modified hub for the clutch structure of my invention;

FIGURE 2A is an end view of the hub of FIGURE 2; and

FIGURES 3A, 3B, 3C and 3D are partial unwrapped views showing the relative positions of the teeth of the sleeve and the blocker ring of FIGURES 1 and 1A during various phases of the shift interval.

Figure 1:
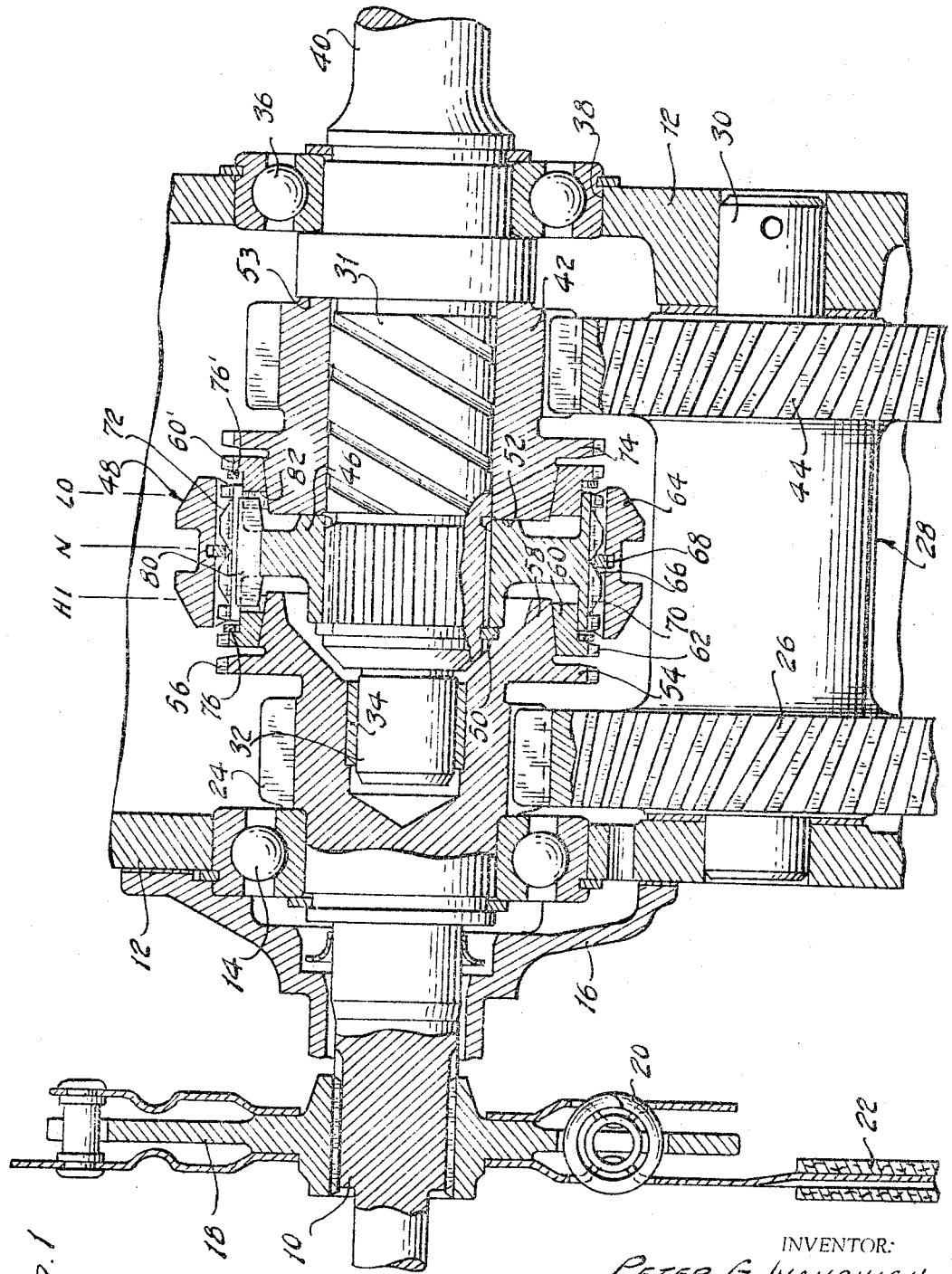
FIGURE 1 shows a cross sectional assembly view of one form of my invention.

Referring first to FIGURE 1, numeral 10 designates a power input shaft of a manually controlled gear system for a power transmission mechanism. The transmission housing is shown in part at 12. The shaft 10 is journaled by means of a bearing 14 within an opening formed in housing 12. A seal retainer and clutch throw-out bearing support member 16 is secured to the outer surface of the housing 12. Shaft 10 is splined to a clutch hub 18 which is connected by means of a spring damper assembly, shown in part at 20, to a friction clutch disc 22. This disc forms a part of a manually controlled neutral clutch that normally is employed in a vehicle drive line to establish a releasable connection between the vehicle engine and the power input shaft 10.

Shaft 10 is connected to and formed integrally with a power input gear 24. This gear meshes with a gear element 26 of the cluster gear assembly 28. This assembly is journaled for rotation upon the cluster gear shaft 30 which in turn is end supported in cooperating openings formed in the housing 12.

An intermediate shaft 31 is formed with a reduced diameter end 32 which in turn is journaled within a bearing opening 34 formed in power input gear 24. It is journaled also by means of a bearing 36 with an opening 38 formed in the housing 12.

A power output shaft 40 is connected directly to intermediate shaft 31.

A power output gear 42 is journaled upon intermediate shaft 31. It meshes drivably with a gear element 44 of the cluster gear assembly 28. Gear elements 26 and 44 rotate together in unison.

Shaft 31 is externally splined to receive an internally splined hub 46 for a synchronizer clutch assembly identified generally by reference character 48. Hub 46 is held axially fast upon shaft 31 by means of a snap ring 50. Hub 46 engages a shoulder 52 formed on gear 42. The other end of gear 42 engages the shoulder 53 formed on shaft 31.

Power input gear 24 is formed with a clutch element 54 having external clutch teeth 56. It is formed also with a coned element 58 about which is positioned a blocker ring 60 having an internal cone surface that cooperates with the external cone surface of cone element 58. Blocker ring 60 is formed with external teeth 62.

A synchronizer clutch sleeve 64 is formed with internal clutch teeth that slidably register with external teeth formed on hub 46. An annular groove 66 formed on the splined periphery of hub 46 is adapted to receive a radially yieldable detent spring 68 that encircles the hub 46. Spring 68 is received within a groove formed in sleeve 64. When the spring 68 engages the groove 66, the sleeve 64 is in the neutral position indicated by the letter "N." If the sleeve 64 is shifted in a left-hand direction as viewed in FIGURE 1, spring 68 is received within another groove 70 formed in the periphery of hub 46. When the sleeve assumes this position, the teeth of the sleeve 64 engage drivably the teeth 56 to establish a high speed drive ratio. This position of the sleeve is indicated in FIGURE 1 by the symbol "HI."

Another groove 72 is formed about the periphery of hub 46. It also receives spring 68 when the sleeve 64 is shifted in a right-hand direction. This position of the sleeve 64 corresponds to a low speed driving ratio and the internal teeth of the sleeve 64 engage external teeth formed by a clutch member 74 carried by the gear 42. Gear 42 thus becomes locked to shaft 31 to establish a torque delivery path with a reduced speed ratio. This path is defined by shaft 10, gear 24, gear element 26, gear element 44, gear 42 and power output shaft 40.

Surrounding the blocker ring 60 is a circular spring 76 having its ends spaced from one another to provide a gap as shown in FIGURE 3A at 78. Spring 76 is located between teeth 62 and the ends of the external teeth formed on the hub 46. As the sleeve 64 is shifted in a left-hand direction as viewed in FIGURE 1, the tapered end of the teeth of the sleeve 64 rides over spring 76 thereby compressing it radially inward. This creates an axial thrust upon blocker ring 60 to establish a clutching action between the coned surfaces of the ring 60 and the element 58.

If a differential speed exists between gear 24 and shaft 31, the ring 60 then will be shifted relative to hub 46 to the extent permitted by a reaction bar 80. This bar is received within a cooperating notch formed in the periphery of hub 46. It extends axially in a left-hand direction, as viewed in FIGURE 1, and is received within a notch 82 formed in the adjacent side of ring 60. The width of notch 82 is greater than the width of thrust bar 80 by an amount equal to one-half the circular pitch of the teeth 62. Thrust bar 80 thus limits the extent of relative rotation between the ring 60 and the hub 46.

When the ring 60 assumes the position shown in FIGURE 1, the teeth of the sleeve 64 are misaligned with respect to the teeth 62. The ends of the internal teeth of sleeve 64 are chamfered so that the chamfered surfaces will engage cooperating chamfered surfaces on the teeth 62. Continued application of a shifting force to the sleeve 64 in a left-hand direction then will result in continued clutching action of the cooperating coned surfaces for the element 58 and the ring 60. This action continues until the relative inertia of the rotating parts is dissipated. At that time the gear 24 will rotate at the same speed as the shaft 31. When this occurs the teeth of the sleeve 64 can pass through the teeth 62 of the blocker ring 60 and drivably engage teeth 56. This establishes a driving connection between shaft 31 and gear 24.

When the teeth of the sleeve 64 and the teeth 56 are fully engaged, ring 68 will have been received within groove 70 on the synchronizer hub 46 thus establishing a fixed position for the sleeve 64. The grooves 70, 66 and 72 are formed with tapered sides so that the inherent resiliency of the spring 68 will tend to maintain the sleeve 64 in one of its operating positions rather than at some intermediate position.

The gear 42 has a blocker ring 60' and a blocker ring spring 76' which correspond respectively to blocker ring 60 and spring 76 described with reference to gear 24. Blocker ring 60' functions in a manner similar to blocker ring 60 to establish synchronism between shaft 31 and gear 42 prior to shifting movement of the sleeve 64 in a right-hand direction.

In the modified construction of FIGURE 1A, the sleeve detent system includes grooves formed in the sleeve rather than the hub. Similarly, the detent spring is carried in a groove formed in the hub rather than the sleeve. The function of the grooves and the spring is the same as the corresponding function of the grooves and spring of FIGURE 1. The elements in FIGURE 1A that correspond to elements in FIGURE 1 have been designated by similar reference characters although prime notations are added.

In FIGURES 2 and 2A I have illustrated a modified synchronizer hub. It does not require the use of a thrust bar 80, but instead it is provided with a pair of axial slots 84 and 86. The overhung ends of the periphery of the hub 46 that are located between the slots can be bent radially inwardly as shown at 88 and 90. The end 90 can be received within slot 82 in the blocker ring 60 and end 88 can be received within the corresponding slot formed in blocker ring 60'. These ends 88 and 90 can be formed in this fashion prior to the cutting operation during which the external teeth of the hub 46 are formed.

Referring next to FIGURES 3A, 3B, 3C and 3D, I have illustrated various operating positions for the teeth of the blocker rings 60 and 60' with respect to the teeth of sleeve 64. In FIGURE 3A the sleeve 64 is in its neutral position and the teeth 62 can assume any relative position with respect to the teeth of sleeve 64. In FIGURE 3B the sleeve 64 has been shifted over spring 76 thereby creating a clutching action between the cone surfaces of the ring 60 and the element 58. The ring 60 thus is caused to shift from the position shown in FIGURE 3A a distance equal to one-quarter of the circular pitch for the teeth 62. The chamfered surfaces of the teeth 62 thus engage the corresponding chamfered surfaces of the ends of the teeth for sleeve 64. Continued application of an axial thrust upon sleeve 64 thus causes the cone clutch for the blocker ring to become engaged to a greater degree until the inertia is dissipated. At that time it is possible to shift the sleeve 64 to the high speed ratio position. This is illustrated in FIGURE 3D. FIGURE 3C shows the relative position of the teeth 62 with respect to the teeth of sleeve 64 just prior to the completion of the shifting of the sleeve 64.

It is not necessary in an arrangement of this type to provide a detent mechanism for the linkage system employed for shifting the sleeve 64. The sleeve 64 is positioned in either the neutral position or the clutching position by the action of the spring 68 and the corresponding tapered grooves formed in the interior of the sleeve 64. Wear of the shift fork that is received within the external groove of the sleeve 64 thus is eliminated. Complete shifting movement of the sleeve 64 is accomplished during each shift cycle regardless of maladjustment or miscalibration of the linkage system employed for actuating it.

The clutching action established by the springs 76 and 76' assures that the blocker ring will be engaged and will properly position the blocker ring teeth with respect to the sleeve for each ratio shift. This eliminates the possibility of a so-called "crash-through" condition.

Having thus described preferred forms of my invention, what I claim and desire to secure by U.S. Letters Patent is:

1. A synchronizer clutch assembly adapted to drivably connect a driving member with a driven member and comprising a synchronizer hub carried by one member, clutch teeth carried by the other member, a blocker ring situated between said clutch teeth and said hub, said other member and said blocker ring having cooperating friction clutch surfaces, a synchronizer clutch sleeve having internal clutch teeth drivably carried by said clutch hub, means for establishing a driving connection between said blocker ring and said hub while accommodating a limited degree of rotary lost motion therebetween, and yieldable spring means located between said blocker ring and said sleeve including a portion engageable with the teeth of said sleeve as the latter is shifted toward said other member whereby the teeth of said blocker ring are shifted rotatably relative to said hub into the path of motion of the teeth of said sleeve, the teeth of said sleeve engaging the teeth of said blocker ring to cause clutching engagement of said clutch surfaces, the ends of the teeth of said sleeve being tapered, said spring means including a circular spring element surrounding said blocker ring and compressible radially inwardly as it engages the tapered ends of the teeth of said sleeve.

2. A synchronizer clutch assembly adapted to establish synchronous clutching action between a driving member and a driven member, a synchronizer clutch hub carried by one of said members, a clutch element having external clutch teeth carried by the other member, a blocker ring situated between said clutch teeth and said hub, said blocker ring having formed thereon external clutch teeth, internal clutch teeth formed in said sleeve, said sleeve being shiftable toward said driven member to establish clutching engagement with the teeth of said clutch element, spring biased detent means between said sleeve and the periphery of said hub for establishing a definite clutch release position and clutch engaged position for said sleeve with respect to said hub, a radially yieldable spring situated between said blocker ring and the teeth of said sleeve and disposed in the path of movement of the teeth of said sleeve, said clutch element and said blocker ring having cooperating friction clutch surfaces, and means for establishing a driving connection between said blocker ring and said hub while accommodating a limited degree of relative lost motion therebetween, the teeth of said sleeve engaging said spring to establish clutching action between said clutch element and said blocker ring thereby causing the teeth of said blocker ring to shift into the path of movement of the teeth of said sleeve until synchronism is established between said driving and driven members.

3. A synchronizer clutch assembly for establishing a driving connection between a driving member and a driven member, a hub carried by one of said members, a clutch element having external clutch teeth carried by the other member, a first set of teeth formed on the periphery of said hub, a synchronizer clutch sleeve mounted on said hub, a second set of synchronizer clutch teeth formed in said sleeve, said sets of teeth being engageable with each other and accommodating axial shifting movement of said sleeve with respect to said hub, said sleeve being shiftable into clutching engagement with the teeth of said clutch element, grooves formed in one of said sets of teeth, and a radially movable spring element carried by the other of said sets of teeth, said spring element being engageable with said grooves to establish a fully engaged position and a fully released position for said sleeve with respect to said hub, a blocker ring situated between the teeth of said clutch element and the teeth of said hub, a radially yieldable spring situated between said blocker ring and the teeth of said sleeve and disposed in the path of movement of the teeth of said sleeve, said clutch element and said blocker ring having cooperating friction clutch surfaces, and means for establishing a driving connection between said blocker ring and said hub while accommodating a limited degree of relative lost motion therebetween, the teeth of said sleeve engaging said spring to establish clutching action between said clutch element and said blocker ring thereby causing the teeth of said blocker ring to shift into the path of movement of the teeth of said sleeve until synchronism is established between said driving and driven members.

4. A synchronizer clutch assembly adapted to establish synchronous clutching action between a driving member and a driven member, a synchronizer clutch hub carried by one of said members, a clutch element having external clutch teeth carried by the other member, a blocker ring situated between said clutch teeth and said hub, said blocker ring having formed thereon external clutch teeth, internal clutch teeth formed in said sleeve, said sleeve being shiftable toward said driven member to establish clutching engagement with the teeth of said clutch element, spring biased detent means between said sleeve and the periphery of said hub for establishing a definite clutch release position and clutch engaged position for said sleeve with respect to said hub, a radially yieldable spring situated between said blocker ring and the teeth of said sleeve and disposed in the path of movement of the teeth of said sleeve, said clutch element and said blocker ring having cooperating friction clutch surfaces, and means for establishing a driving connection between said blocker ring and said hub while accommodating a limited degree of relative lost motion therebetween, the teeth of said sleeve engaging said spring to establish clutching action between said clutch element and said blocker ring thereby causing the teeth of said blocker ring to shift into the path of movement of the teeth of said sleeve until synchronism is established between said driving and driven members, the ends of the teeth of said sleeve being tapered, said spring being in the form of a circular split ring, said split ring engaging the tapered ends of the teeth and yieldable radially inwardly as said sleeve is shifted toward said other member.

5. A synchronizer clutch assembly for establishing a driving connection between a driving member and a driven member, a hub carried by one of said members, a clutch element having external clutch teeth carried by the other member, a first set of teeth formed on the periphery of said hub, a synchronizer clutch sleeve mounted on said hub, a second set of synchronizer clutch teeth formed in said sleeve, said sets of teeth being engageable with each other and accommodating axial shifting movement of said sleeve with respect to said hub, said sleeve being shiftable into clutching engagement with the teeth of said clutch element, grooves formed in one of said sets of teeth, a radially movable spring element carried by the other of said sets of teeth, said spring element being engageable with said grooves to establish a fully engaged position and a fully released position for said sleeve with respect to said hub, a blocker ring situated between the teeth of said clutch element and the teeth of said hub, a radially yieldable spring situated between said blocker ring and the teeth of said sleeve and disposed in the path of movement of the teeth of said sleeve, said clutch element and said blocker ring having cooperating friction clutch surfaces, and means for establishing a driving connection between said blocker ring and said hub while accommodating a limited degree of relative lost motion therebetween, the teeth of said sleeve engaging said spring to establish clutching action between said clutch element and said blocker ring thereby causing the teeth of said blocker ring to shift into the path of movement of the teeth of said sleeve until synchronism is established between said driving and driven members, the ends of the teeth of said sleeve being tapered, said spring being in the form of a circular split ring, said split ring engaging the tapered ends of the teeth and yieldable radially inwardly as said sleeve is shifted toward said other member.

References Cited by the Examiner

UNITED STATES PATENTS

| | | | |
|---|---|---|---|
| 2,478,355 | 8/1949 | Auten | 192—53 |
| 2,495,411 | 1/1950 | Frost | 192—53 |

FOREIGN PATENTS

| | | |
|---|---|---|
| 1,156,685 | 12/1957 | France. |
| 933,364 | 9/1955 | Germany. |

DAVID J. WILLIAMOWSKY, *Primary Examiner.*